United States Patent Office 2,986,213
Patented May 30, 1961

2,986,213

PROCESS AND COMPOSITION FOR HYDRAULICALLY FRACTURING FORMATIONS

James E. Fox, Jr., Fort Worth, Tex., assignor to Pan American Petroleum Corporation, Tulsa, Okla., a corporation of Delaware No Drawing. Filed Aug. 12, 1957, Ser. No. 677,789

5 Claims. (Cl. 166—42)

This invention relates to an improved process and composition for use in treating formations penetrated by a well. More specifically it concerns a fluid suitable for use in the Hydrafrac process to increase the productivity of a petroleum-bearing formation.

Many different fluids have been used in the Hydrafrac process. Although untreated water and other low viscosity liquids have been used as fracturing fluids, particularly for low permeability formations, it is desirable to use a fluid having a low filtrate rate because greater fracture extension is possible with those fluids. Low filtrate rate fluids have been prepared by numerous methods. One particularly effective fluid is prepared by gelling a hydrocarbon, such as kerosene, with a soap, such as napalm. Emulsions of oil and water also have been used in the Hydrafrac process. Another type of fluid which has been used is a colloidal dispersion of a material such as asphalt in oil. Although these fluids having low filtrate rates are satisfactory from the standpoint of fracture initiation and extension, they have the disadvantage that they are expensive and frequently they are difficult to prepare with field mixing equipment. Also, some are likely to produce partial permanent plugging of the oil-bearing formation unless a special solvent is used to cause the fluid to flow back into the well when the pressure is released.

It is an object of this invention to provide a fracturing fluid using relatively inexpensive materials. It is a further object to provide a low filtrate rate fluid which can be prepared without using special mixing equipment. A further object of this invention is to provide an improved process employing a fracturing fluid which will temporarily plug the formation but will be destroyed to restore the original permeability of the formation.

This improved fracturing fluid comprises a mixture of blackstrap molasses and a hydrocarbon liquid. This mixture has been found to be particularly effective in reducing the filtrate rate of fluids used to fracture formations.

Blackstrap molasses, a by-product of the cane sugar industry, is the mother liquor remaining after repeated crystallization of sugar from cane juice such that no more sugar can be economically recovered. The specific gravity of blackstrap molasses is in the range of from 1.30 to 1.40. A typical analysis of blackstrap molasses is as follows:

| Component: | Weight percent |
|---|---|
| Sucrose | 30 |
| Reducing sugars | 20 |
| Ash | 10 |
| Organic non-sugars | 20 |
| Water | 20 |

One volume of molasses may be diluted with as much as four volumes of water and retain satisfactory fluid loss reducing properties. Aside from the economic advantage in using diluted molasses, the settling rate of the diluted molasses in oil is less than that of undiluted molasses due to the lower difference between the densities of the two liquid phases.

Suitable hydrocarbon liquids which may be used in preparing this fracturing fluid are crude oil, kerosene, diesel oil and fuel oil. The higher viscosity liquids such as viscous crude oil and fuel oil are preferred because they produce a more stable dispersion with the molasses.

The volumetric ratio of molasses to oil is from about 1:1 to about 1:15; however, I prefer to use mixtures in the range from 1:3 to 1:7.

A satisfactory procedure for fracturing a formation with this mixture is by the alternate displacement of quantities of oil and molasses down the well. The preferred method is to inject both liquids simultaneously. An orifice type mixer may be used to improve the degree of mixing; however, adequate mixing usually results from the turbulence of the fluids flowing down the well. For example, where it is desired to fracture a formation using a 1:5 ratio of molasses to oil at an injection rate of 24 barrels per minute, one pump is set to deliver molasses at 4 barrels per minute and the other pump is set to deliver oil at 20 barrels per minute. When alternate injection of molasses and oil is used, one barrel of molasses, for example, may be injected followed by 5 barrels of oil, the pump rate remaining constant at 24 barrels per minute. The sizes of the liquid slugs may be greater or less than those given in the above example. They should be held below the level where the filtrate rate of the oil increases due to the oil breaking through the forward bank of molasses as evidenced by a gradual decrease in pump pressure. Ordinarily the volume of molasses which should be injected at one time is from 0.1 to about 10 barrels. The preferred range is from 0.5 to 2 barrels per slug.

Although the turbulence produced by pumping the mixture down the well is usually sufficient to keep the molasses dispersed in the oil, in some instances it may be desirable to add a surface active agent to stabilize the dispersion. The surface active agent may be dissolved in either the oil or molasses, depending upon which component has the greater solvent power for the particular agent used. Any of a number of commercially available surface active agents may be used to stabilize the dispersions. A water soluble agent such as polyoxyethylene sorbitan monolaurate containing about 12 ethylene oxide groups per molecule, available commercially as Tween-20, may be added to the molasses. In the alternative, an oil soluble agent such as polyoxyethylene sorbitol tetraoleate available commerically as G-2854 may be added to the oil before mixing it with the molasses.

On some occasions it may be desirable to add a material often referred to as a breaker or solvent which aids in removing the molasses from the well after the fracturing step has been completed. Suitable materials for this purpose are the bacteria, enzymes and yeasts which are used extensively in the fermentation industry to convert the sugars in molasses to ethyl alcohol and carbon dioxide. Fermentation reduces the viscosity and volume of the molasses in the fractures, thereby increasing the filtrate rate and promoting the backflow of the fluids into the well. Bacteria of the Clostridium genus, the enzymes invertase and zymase and the yeasts, such as *Saccharomyces cerevisiae,* are suitable fermentation promoters. The action of these materials on the sugar is slow and when added at the time the mixture is pumped down the well, they do not produce a significant change in the filtrate rate of the fluid during the fracturing step.

Examples of the filtration characteristics, i.e., the filtrate rate of mixtures of blackstrap molasses and oil which were measured using the apparatus and procedure described in API RP-29, third edition, May 1950, sect. IV, are given in the following Table I.

*Table I*

| Test | Oil | Blackstrap Molasses | Water | Surface Active Agents | Fluid Loss, 30 Min. |
|---|---|---|---|---|---|
| 1 | 800 | 200 | 0 | 0 | 77 |
| 2 | 250 | 50 | 10 | 2 | 0 |
| 3 | 200 | 25 | 25 | 2 | 3 |
| 4 | 875 | 25 | 100 | 4 | 45 |

The API recommended procedure was modified by using the filter press in an inverted position, i.e., with the filter paper at the top of the cell. This change was made to avoid the reduction in filtrate rate produced by settling of the molasses from the quiescent mixture. Before the mixture was placed in the filter press it was stirred at 10,000 r.p.m. for two minutes to obtain thorough mixing. Ellenberger crude having an API filtrate rate of 250 ml. in two minutes at 80° F. was used as the oil phase in the examples shown. All tests were made at 80° F. The quantities of the various ingredients represent volume in milliliters. Tween-20 was added in all except test 1 in Table I to stabilize the dispersion and retard segregation in the filter press. The fluid losses observed in tests 2, 3 and 4 are thought to be more representative of what will be experienced in actual field operations where the turbulence of the mixture retards segregation.

It can be seen that the filtrate rate of a relatively high filtrate rate hydrocarbon liquid, such as crude oil, can be reduced substantially by the addition of blackstrap molasses to produce a fluid which is particularly suitable for use in the Hydrafrac process and other applications where a liquid having a low filtrate rate is desired. Fluids having an API filtrate rate less than 100 ml. in 30 minutes are generally considered to be satisfactory for fracture extension.

It should be understood that the well known fracture propping agents, such as sand, glass spheres, metal pellets and the like may be added to this fracturing fluid. Although the material has been referred to primarily as a fracturing fluid, it should not be so limited. The invention should be construed to be limited only by the scope of the appended claims.

I claim:

1. A process of treating a well to increase the productivity of a formation penetrated by said well wherein quantities of a hydrocarbon liquid and blackstrap molasses are alternately injected into said well at a rate sufficient to extend a fracture into said formation, the volumetric ratio of said hydrocarbon liquid to said blackstrap molasses being from about 1 to about 15 volumes of said hydrocarbon liquid to one volume of said blackstrap molasses and the volume of said blackstrap molasses which is injected between successive volumes of said hydrocarbon liquid being from about 0.5 to about 2 barrels.

2. A hydraulic fracturing fluid comprising essentially from about 1 to about 15 volumes of a hydrocarbon liquid and about 1 volume of blackstrap molasses.

3. A hydraulic fracturing fluid comprising essentially from about 1 to about 15 volumes of a hydrocarbon liquid, about 1 volume of blackstrap molasses and sufficient surface active agent to stabilize the dispersion of said molasses in said hydrocarbon liquid.

4. A hydraulic fracturing fluid comprising essentially from about 3 to about 7 volumes of a hydrocarbon liquid and about 1 volume of blackstrap molasses.

5. A hydraulic fracturing fluid comprising essentially from about 3 to about 7 volumes of a hydrocarbon liquid, about 1 volume of blackstrap molasses and sufficient surface active agent to stabilize the dispersion of said molasses in said hydrocarbon liquid.

References Cited in the file of this patent

UNITED STATES PATENTS

| | | |
|---|---|---|
| 2,412,276 | Larsen | Dec. 10, 1946 |
| 2,596,843 | Farris | May 13, 1952 |
| 2,645,291 | Voorhees | July 14, 1953 |
| 2,771,138 | Beeson | Nov. 20, 1956 |

OTHER REFERENCES

Coulter: Chemical Additives, Prod. Sec., World Oil, Feb. 1, 1957, pages 148, 149, 152 and 157.